Figure 1:
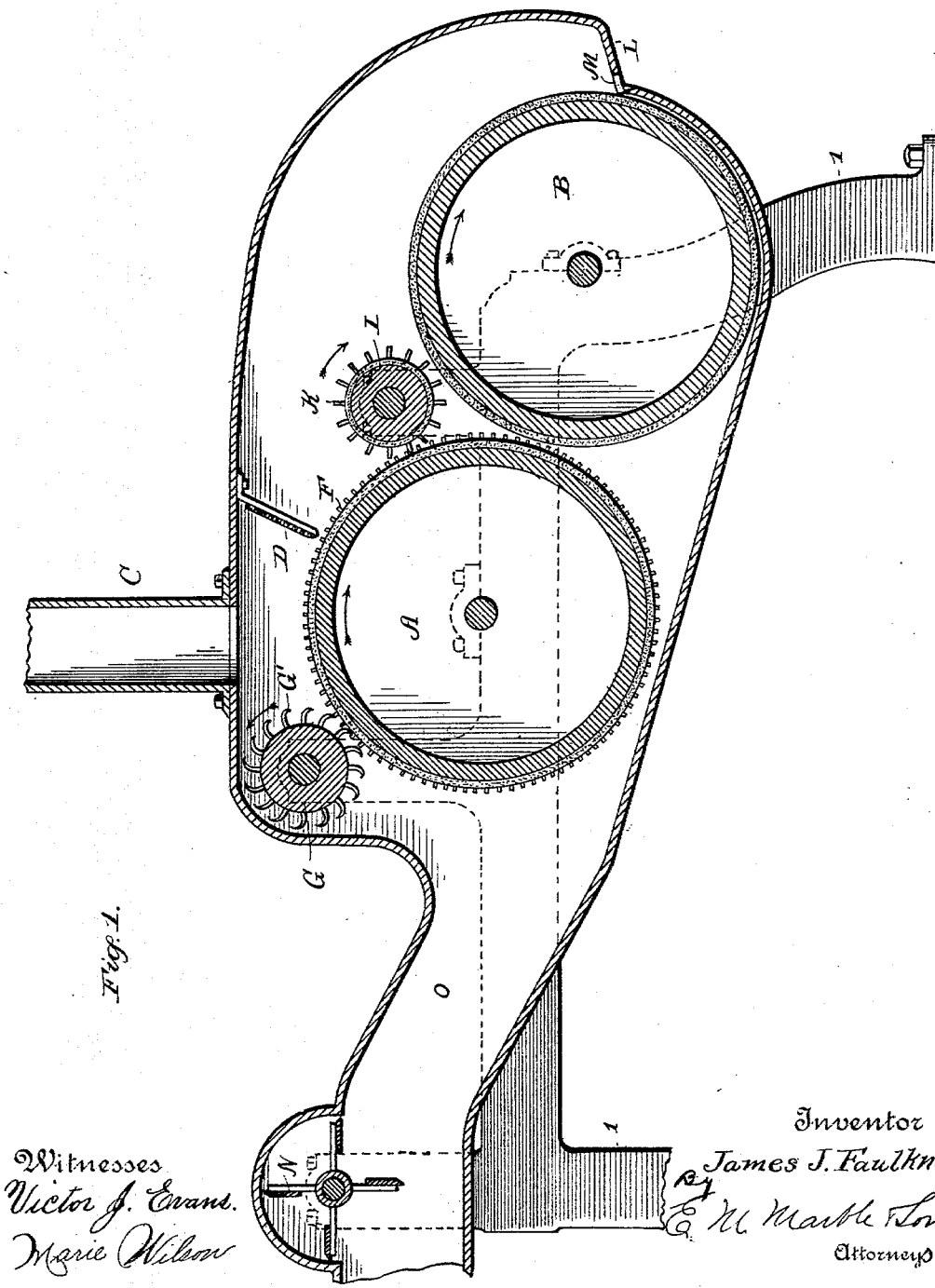

(No Model.) 3 Sheets—Sheet 1.
J. J. FAULKNER.
COTTON SEED DELINTER.

No. 546,270. Patented Sept. 10, 1895.

Witnesses
Victor J. Evans.
Marie Wilson

Inventor
James J. Faulkner
By E. N. Marble & Love
Attorneys (No Model.)  J. J. FAULKNER.  3 Sheets—Sheet 3.
COTTON SEED DELINTER.

No. 546,270.  Patented Sept. 10, 1895.

Witnesses
Victor J. Evans
Marie Wilson

Inventor
James J. Faulkner.
By E. M. Marble & Sons
Attorneys

UNITED STATES PATENT OFFICE.

JAMES J. FAULKNER, OF MEMPHIS, TENNESSEE, ASSIGNOR, BY DIRECT AND MESNE ASSIGNMENTS, TO THE STANDARD COTTON SEED COMPANY, OF ARKANSAS.

COTTON-SEED DELINTER.

SPECIFICATION forming part of Letters Patent No. 546,270, dated September 10, 1895.

Application filed May 18, 1895. Serial No. 549,813. (No model.)

*To all whom it may concern:*

Be it known that I, JAMES J. FAULKNER, a citizen of the United States, residing at Memphis, county of Shelby, and State of Tennessee, have invented certain new and useful Improvements in Cotton-Seed Delinters, of which the following is a full, clear, and exact specification.

My invention relates to improvements in machines for treating cotton-seed, and particularly to improvements in that class thereof known as "delinters;" and it consists in the improved cotton-seed delinter whose construction and arrangement of parts will be hereinafter described, and particularly pointed out in the claims.

The objects of my invention are to produce a cotton-seed delinter which will be simple in construction, cheap to manufacture, easily put in position, and economical in its use of power, which will delint the seed rapidly and efficiently without breaking or injuring the seed, and which will clean the ends as well as the sides of the seed.

In the accomplishment of the objects of my invention I make use of two parallel rolls, provided with smooth abrading-surfaces, such as those formed by fine emery, and journaled so that their meeting faces are so close together as to prevent seed falling between the same. These rolls are formed with spiral formations at opposite ends to feed the seed forward. A fan stationed in an air-flume connected with the compartment or casing in which the seed is treated carries away the lint separated by the action of the machine, while the seed escapes through discharge-openings formed in the casing at one end of the machine. The dirt is screened from the seed by escaping through irregular apertures formed in a plate which fits closely against the surface of one of the abrading-cylinders. Preferably, though not necessarily, I journal one of the cylinders on a level slightly higher than that of the other, and obtain a double abrading action on the seed treated by using a check-plate to prevent seed passing over the surface of the upper roll from at once falling into the lower roll, and feeding the seed directly upon the surface of said upper roll, causing it to be conveyed the whole length of said roll, and then back between the meeting surfaces of the two rolls. A more perfect delinting action is thus secured, and the seed can be perfectly cleansed. I convey the seed the length of the two rollers in part by the spiral formations on the abrading-cylinders, in part by the natural gravitation of the seed when acted upon by a rotating surface, and in part by spiked rollers, the spikes being set at such an angle as to retard the passage of the seed while yet positively insuring such passage. The spikes, on the conveyer or roller which works between the top abrading-roller and the casing are further bent or curved in such a manner as to prevent the passage of seed through the aperture between the casing and the roller, into the air-flume. The roller or conveyer which works between the meeting surfaces of the two abrading-rolls is partly smooth, and partly covered with spikes set closer together than the length of the cotton-seed, forming in effect compartments into which the ends of the seed fall, thus presenting their other ends to the abrading surfaces of the rollers and insuring the complete cleaning of the seed.

My invention is fully represented in the drawings which accompany and form a part of this application, in which the same reference letters and numerals refer to the same or corresponding parts, and in which—

Figure 2:
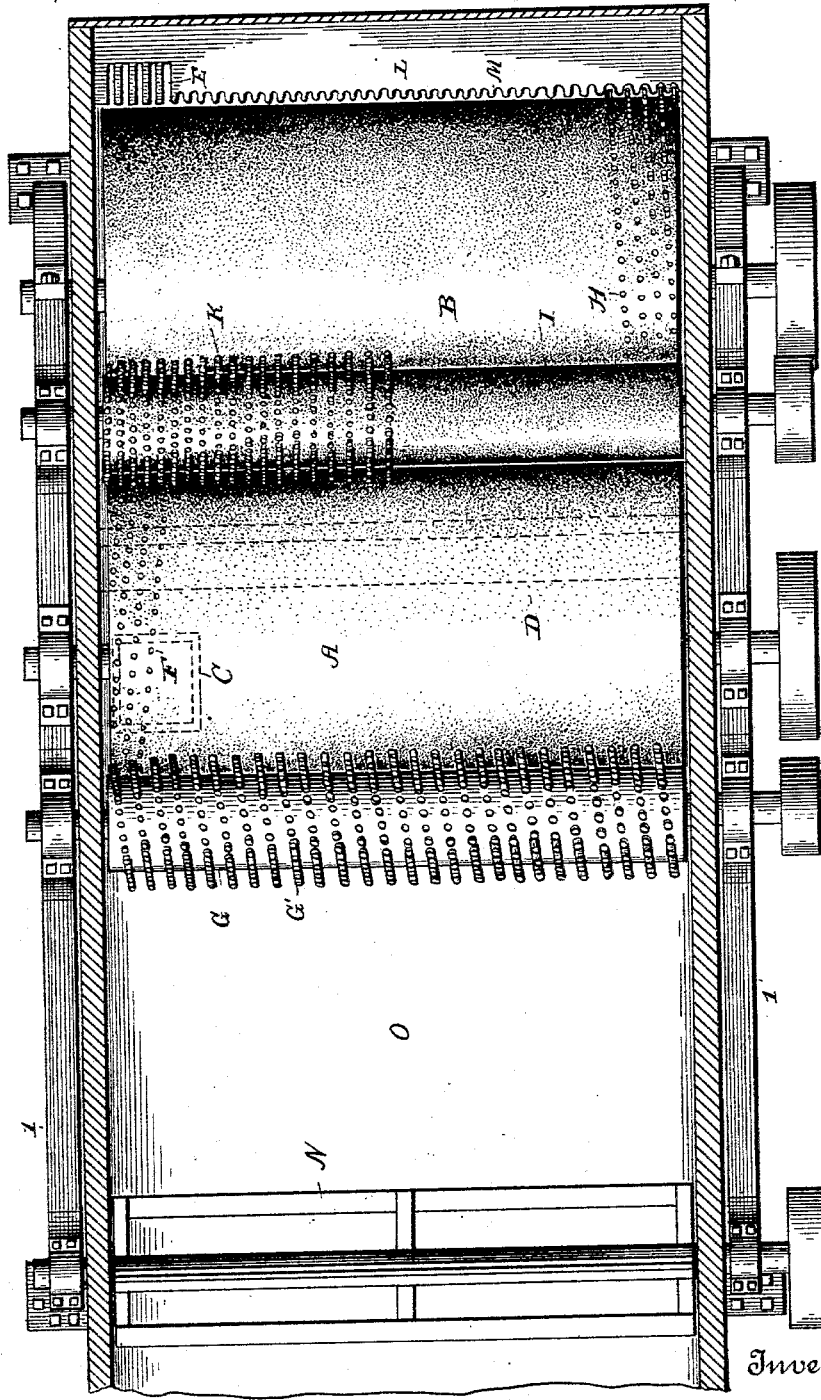
Figure 3:
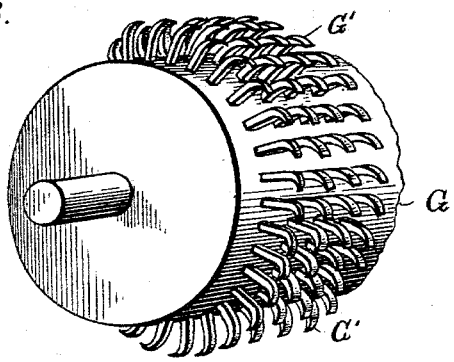
Figure 4:
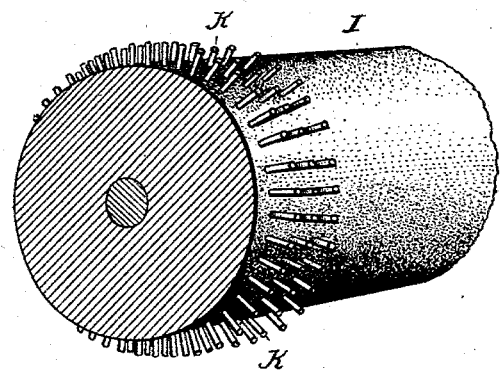
Figure 5:
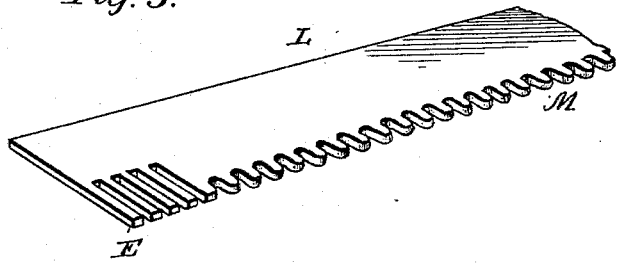

Figure 1 is a cross-section of the machine, showing the shape of the compartment or casing in which the seed is cleaned. Fig. 2 is a top view of my machine, showing the abrading-rolls and the relation they bear to the other parts of my machine. Fig. 3 is a detail perspective view of the spiked rolls which work in connection with the upper abrading-roll, and shows the inclination and curve of the spikes. Fig. 4 is a detail perspective view of the lower spiked roll. Fig. 5 is a detail view of the check-plate which serves as a dirt and seed outlet.

Referring to the drawings, 1 represents the machine-frame, in which are formed suitable journals for the abrading-rolls A and B, which are supported, as shown, upon central shafts in the usual manner. Roller A is set slightly above roller B, so that the two rolls are on different levels, but the meeting surfaces of the two rolls are so close together as to prevent seed from falling through between them. The casing is shaped so as to form a compartment to receive the seed above the abrading-rolls, and it is into this compartment and on the abrading-surface of the upper roller A that the feed-spout C opens. The seed falls upon the upper abrading-roll, but is prevented from falling down at once to the meeting surfaces of the two rolls by the check-plate D, which may be perforated, as shown. This check-plate does not extend sufficiently close to the abrading-surface of the cylinder to prevent the passage of all seed, but merely the bulk-seed, a passage being afforded between it and the surface of the abrading-roll for the cleaned seed, through which it may fall to the meeting surfaces of the two abrading-rolls, and thence out through the discharge-opening E, which will be hereinafter described. The check-plate also does not extend the entire length of the upper cylinder, but at the farther end permits the seed to fall upon the meeting surfaces of the two cylinders. The seed is fed the length of this upper cylinder, partly by the natural gravitating tendency of the seed when acted upon by the rotating cylinder. This tendency is assisted and made effective, however, by two different means—first, I form spirally-arranged lines of spikes F directly under the feeding-spout to start the seed on their course, and, second, I make use of a conveyer or agitator G, which occupies the space between the surface of the cylinder and that end of the compartment formed by the casing. The teeth or spikes G' on this roller are spirally arranged, so as to act as a conveyer; but to retard the passage of the seed, and to subject it for a longer period to the abrading action of the surface of the abrading-cylinder, the spikes are bent against the motion of the seed, as shown. To further prevent the seed being carried out of the compartment in which it is to be treated by the spikes on this roller, the spikes are curved, as shown, so as to prevent any seed being carried out. The seed introduced through the feed-spout C is then carried along the surface of the top abrading-roll and partially delinted until it reaches the end of said roll and falls through the opening afforded by the check-plate D onto the meeting surfaces of the two abrading-rolls. It is here that the main delinting action is performed. To start the seed forward on its travel over the length of the meeting portions of the two cylinders, and to assist the natual gravital tendency, I form on this end of the lower cylinder spirally-arranged spikes H, similar to the spikes F formed on the upper cylinder, and to further assist in the passage of the seed I make use of an agitator or conveyer I. This agitator stirs up the seed and constantly presents them to the abrading-surfaces of the rollers. The first portion of this agitator is made perfectly smooth, as the spiral spikes H on the lower cylinder B are sufficient to feed the seed. Here the sides of the seed are thoroughly cleaned, the seed forming circular lines around the agitator and presenting in main only their sides to the delinting or abrading action of the cylinders. To delint the ends of the seed and to assist in their travel over the front end of the rollers, where the tendency imparted to the seed by the spiral spikes H is lessened and is partially negatived by the spirally-arranged spikes F, I place on the remainder of the agitator I straight spikes K and set these spikes closer together than the length of the cotton-seed. When the seed reaches this portion of the agitator the ends naturally fall into the compartments thus presented, and their outer ends are thus subjected to the abrading action. It is here that the ends of the seed are cleaned, the conjoint action of the passage of the seed over the top roller, over the first portion of the meeting surfaces of the two rollers, and over this portion where the agitator I is spiked, being to thoroughly cleanse or scour the seed and to remove lint from every portion thereof.

The seed is prevented from falling out of the compartment formed by the casing by the check-plate L, whose inner face sets close against the surface of the lower cylinder. For the greater part of its length the inner surface of this check-plate is formed with minute irregularities M, too small to allow seed to escape through them, but sufficiently large to permit the dirt to discharge through them. The seed is thus screened from dirt. At the front end of the machine, where the seed arrives for its final treatment, these irregularities are enlarged into spaces E, through which the seed is discharged, as before stated. The lint formed throughout the delinting action thus described is removed by an air-current formed by the fan N in the flume O, which flume is in free communication with the casing through the longitudinal opening formed therein. From this flume the lint is passed to a condenser-cylinder and formed into a sheet or bat in the usual manner.

The operation of my cotton-seed delinter is as follows: Seed is fed to the machine through the spout C. It is carried along the top surface of the upper abrading-roller A, partly by the gravital tendency of the seed when exposed to the action of a rotating surface, partly by the spiral line of spikes F formed on the end of the cylinder, and partly by the curved teeth on the conveyer G. The curve of these teeth or spikes prevent the seed being carried out at this point, and the plate D prevents or checks the body of the seed from falling down upon the lower roll, while permitting the passage of such seed as becomes clean by the abrading action to which the seed is subjected by the abrading-roll A. The seed, after being carried the length of the roller A, lint being removed constantly as it is separated from the seed by the air-currents in the flume O, falls upon the roll B and is carried along between the two abrading-rolls by reason of the initial impulse given by the spiral spikes H. Here the seed is constantly agitated by the agitator-conveyer I. While passing the first part of this distance the seed forms in rolls around the agitator, and in main only the sides of the seed are exposed to the scouring action of the abrading-surfaces; but as the seed reaches the latter part of its travel it is exposed to the action of the spikes K formed on the agitator, and here, as a consequence of the close arrangement of these spikes, is thoroughly scoured on its ends, these spikes being set so close together (closer than the length of the seed) that they form natural pockets or compartments in which the seed rest on end. Dirt is screened from the seed through the irregularities M on the check-plate L and falls to one side of the machine. The cleansed seed escapes through the fingers E formed at one end of this check-plate. The lint is throughout this process sucked away by the air-current created by the fan in the air-flume. The operation thus described is simple, can be accomplished with no great or wasteful expenditure of power, and results in the satisfactory and complete delinting of the seed under treatment.

Having thus fully described my invention, what I claim as new, and desire to secure by Letters Patent, is—

1. In a cotton seed delinter, the combination with two parallel abrading surfaces, journaled with their meeting faces in such close proximity that seed will not pass between the same, and so that an angled inclosure is formed thereby, and means for causing said surfaces to rotate in the same direction, of seed inlet and discharge openings, and means for removing the lint separated by the action of the machine, substantially as described.

2. In a cotton seed delinter, the combination with a plurality of parallel abrading rolls, placed with their meeting faces in such close proximity that seed will not pass between the same, and means for causing said rolls to rotate in the same direction, of seed inlet and discharge openings, and means for removing the lint separated by the action of the machine, substantially as described.

3. In a cotton seed delinter, the combination with two parallel abrading rolls having spiral formations thereon, said rolls being placed with their meeting faces in such close proximity that seed will not pass between the same, and means for causing said rolls to rotate in the same direction, of seed inlet and discharge openings, and means for removing the lint separated by the action of the machine, substantially as described.

4. In a cotton seed delinter, the combination with two parallel abrading rolls having oppositely sloping spiral formations on opposite ends of the same, said rolls being placed with their meeting faces in such close proximity that seed will not pass between the same, and means for causing said rolls to rotate in the same direction, of seed inlet and discharge openings, and means for removing the lint separated by the action of the machine, substantially as described.

5. In a cotton seed delinter, the combination with two parallel abrading surfaces journaled with their meeting faces in such close proximity that seed will not pass between the same, and so that an angled inclosure is formed thereby, and means for causing said surfaces to rotate in the same direction, of seed inlet and discharge openings, means for keeping the seed under treatment in close contact with the abrading surfaces, and means for removing the lint separated by the action of the machine, substantially as described.

6. In a cotton seed delinter, the combination with a plurality of abrading rolls journaled with their meeting faces in such close proximity that seed will not pass between the same, and means for causing said rolls to rotate in the same direction, of seed inlet and discharge openings, means for keeping the seed under treatment in close contact with the abrading surfaces, and means for removing the lint separated by the action of the machine, substantially as described.

7. In a cotton seed delinter, the combination with two parallel abrading rolls, journaled with their meeting faces in such close proximity that seed will not pass between the same, and means for causing said rolls to rotate in the same direction, of seed inlet and discharge openings, an agitator journaled above said meeting surfaces, and means for removing the lint separated by the action of the machine, substantially as described.

8. In a cotton seed delinter, the combination with a plurality of parallel abrading rolls, placed with their meeting surfaces in such close proximity that seed will not pass between the same, and means for causing said rolls to rotate in the same direction, of seed inlet and discharge openings, and means for causing an air current to sweep over the abrading rolls, substantially as described.

9. In a cotton seed delinter, the combination with an abrading roll, and means for preventing uncleansed seed from falling out of the range of action of said roll, of a roller operating in connection with said abrading roll, said roller having spikes, set closer together than the length of the seed, formed on a portion of its surface, substantially as described.

10. In a cotton seed delinter, the combination with an abrading roll, of means for preventing the uncleaned seed from falling out of the range of action of said roll, and a spiked agitator operating in connection with said roll, said spikes being set closer together than the length of the cotton seed, substantially as described.

11. In a cotton seed delinter, the combination with an abrading roll, and means for preventing the seed under treatment from falling out of the range of action thereof, of a check plate having an irregular inner surface arranged in close proximity to said roll, whereby dirt will be permitted to escape, but seed will be retained, substantially as described.

12. In a cotton seed delinter, the combination with an abrading roll, and means for preventing the seed under treatment from falling out of the range of action thereof, of a check plate arranged in close proximity to said roll, said plate having an irregular inner surface to retain the seed but permit the escape of the dirt, and provided with means for permitting the escape of the seed, substantially as described.

13. In a cotton seed delinter, the combination with an abrading roll, and means for preventing the seed under treatment from falling out of the range of action thereof, of a check plate arranged in close proximity to said roll, said plate having an irregular inner surface over part of its length to retain the seed but permit the escape of the dirt, and larger irregularities over the rest of its length to permit the discharge of the cleansed seed, substantially as described.

14. In a cotton seed delinter, the combination with an abrading roll, and a casing forming a compartment above said roll, of a spiked roll stationed between the cylinder and the casing at one end of said compartment, and forming a closure for that end of said compartment said spikes being curved so as to prevent the seed under treatment being carried out of the compartment, substantially as described.

15. In a cotton seed delinter, the combination with an abrading roll, and a casing forming a compartment over the same, of a check plate extending lengthwise of said roll to prevent the seed under treatment from falling out of the range of action thereof, and an agitator having spikes set thereon, curved so as to prevent the seed under treatment being carried out of the compartment, forming a closure for one end of said compartment, substantially as described.

16. In a cotton seed delinter, the combination with two parallel abrading rolls, journaled on different levels but so that their meeting surfaces come in close proximity, means for causing said rolls to rotate in the same direction, and a check plate extending lengthwise of the rolls for preventing seed carried along the upper roll from at once falling onto the lower roll, of means for feeding seed to said upper roll, conveyer devices for carrying the seed along the top roll and back between the meeting surfaces of the two rolls, a seed discharge outlet, and means for removing the lint separated by the action of the machine, substantially as described.

17. In a cotton seed delinter, the combination with two parallel abrading rolls journaled on different levels but so that their meeting surfaces come in close proximity to each other, means for causing said rolls to rotate in the same direction, and a check plate extending nearly the whole length of the upper cylinder for preventing seed carried along the upper roll from falling onto the lower roll, of means for feeding seed to the upper roll and back between the meeting surfaces of the two rolls, a seed discharge outlet, and means for removing the lint separated by the action of the machine, substantially as described.

In testimony whereof I hereunto affix my hand in presence of two witnesses.

JAMES J. FAULKNER.

Witnesses:
L. M. MARBLE,
C. L. BERLIN.